(12) United States Patent
Krenzer

(10) Patent No.: US 8,845,244 B2
(45) Date of Patent: Sep. 30, 2014

(54) DRILL BIT

(75) Inventor: Ulrich Krenzer, Zirndorf (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 692 days.

(21) Appl. No.: 13/000,403

(22) PCT Filed: Jun. 20, 2009

(86) PCT No.: PCT/EP2009/004471
§ 371 (c)(1),
(2), (4) Date: Dec. 21, 2010

(87) PCT Pub. No.: WO2009/153066
PCT Pub. Date: Dec. 23, 2009

(65) Prior Publication Data
US 2011/0103910 A1 May 5, 2011

(30) Foreign Application Priority Data

Jun. 21, 2008 (DE) .......................... 10 2008 029 569
Aug. 21, 2008 (DE) .......................... 10 2008 045 326

(51) Int. Cl.
*B23B 51/02* (2006.01)
(52) U.S. Cl.
CPC ............. *B23B 51/02* (2013.01); *B23B 2251/70* (2013.01); *B23B 2251/56* (2013.01); *B23B 2251/14* (2013.01)
USPC ........................... 408/230; 408/227; 408/229
(58) Field of Classification Search
USPC .......................................... 408/230, 227, 229
See application file for complete search history.

(56) References Cited

U.S. PATENT DOCUMENTS 3,237,488 A * 3/1966 Parone et al. ................. 408/230
4,913,603 A 4/1990 Friedli et al.
(Continued)

FOREIGN PATENT DOCUMENTS

| DE | 102006025294 A1 | 12/2007 |
| JP | 2005-246567 A | 9/2005 |
| WO | WO 88/03849 A | 6/1988 |

OTHER PUBLICATIONS

International Search Report dated Sep. 28, 2009, issued in corresponding international application No. PCT/EP2009/004471.

(Continued)

*Primary Examiner* — Eric A Gates
*Assistant Examiner* — Paul M Janeski
(74) *Attorney, Agent, or Firm* — Ostrolenk Faber LLP

(57) ABSTRACT

A drill bit, has
a front side (5) and a circumferential surface (19) adjoining the front side (5).
The front side (5) has a main cutting edge (7) including a transverse cutting edge (3) extending through a center axis (11) of the drill bit (1), and has two first and second main cutting-edge regions (13, 15) adjoining the transverse cutting edge (9) and extending radially toward the circumferential surface (19).
The circumferential surface (19) comprises at least two chip flutes (21, 23), which between them delimit a first and a second web (25, 27), and three lands, of which a first land adjoins the end of the first main cutting-edge region (13) facing away from the transverse cutting edge (9), and serves as a free cutting-edge land (33), and additionally has a free cutting edge (39), a second land adjoins the end of the second main cutting-edge region (15) facing away from the transverse cutting edge (9), and serves as a guide land (35), and a third land serves as a support land (37).
The drill bit is characterized in that the guide land (35) is disposed on the first web (25) and the support land (37) is disposed, together with the free cutting-edge land (33) having the free cutting edge (39), on the second web (27).

13 Claims, 3 Drawing Sheets

(56) References Cited

U.S. PATENT DOCUMENTS

| | | | |
|---|---|---|---|
| 5,078,554 A * | 1/1992 | Kubota | 408/230 |
| 5,486,075 A * | 1/1996 | Nakamura et al. | 408/230 |
| 6,132,149 A * | 10/2000 | Howarth et al. | 408/230 |
| 6,419,488 B1 * | 7/2002 | McSpadden et al. | 433/102 |
| 7,354,229 B2 * | 4/2008 | Wakui et al. | 408/227 |
| 7,422,396 B2 * | 9/2008 | Takikawa | 408/59 |
| 2008/0199268 A1 | 8/2008 | Krenzer et al. | |

OTHER PUBLICATIONS

Office Action dated Feb. 12, 2013 issued in corresponding Japanese Patent Application No. 2011-513958 with English translation.

English translated International Preliminary Report on Patentability, mailing date Mar. 24, 2011; and attached PCT Notification of Transmittal of Translation of the International Preliminary Report on Patentability (Chapter I or Chapter II of the Patent Corporation Treaty). Total pp. 7.

* cited by examiner

DRILL BIT

CROSS-REFERENCE TO RELATED APPLICATIONS

The present application is a 35 U.S.C. §§371 national phase conversion of PCT/EP2009/004471, filed Jun. 20, 2009, which claims priority of German Application No. 10 2008 029 569.8 filed Jun. 21, 2008, and German Application No. 10 2008 045 326.9 filed Aug. 21, 2008, the contents of which are incorporated by reference herein. The PCT International Application was published in the English language.

BACKGROUND OF THE INVENTION

The invention relates to a drill bit, having a front side and having a circumferential surface adjoining the front side.

Drill bits of the type considered here are known. In the region of their front side they have a main cutting edge, which comprises a transverse cutting edge intersecting a center axis of the drill bit and, adjoining the transverse cutting edge, main cutting-edge regions extending toward the circumferential surface. Provided in the region of the circumferential surface are three lands, of which two directly adjoin the radially outer ends of the main cutting-edge regions. A third land is located between these two lands. During the machining of a workpiece, the drill bit is supported on a drilled hole surface via the lands, and is thereby guided. The lands also serve to prevent vibration and to prevent the drill bit from drifting out of the axis of rotation. In the case of very accurately produced twist drill bits used to produce drilled holes whose diameter corresponds to that of the drill bit, high compressive stresses occur at the lands, because a lubricating film is scarcely able to form. The result of this is that there can be a very great increase in the cutting forces and in the temperature, which can result in a short service life of the drill bit and also in alterations of the workpiece material. Since the drill bit expands because of the heating, the compressive stresses and the problems associated therewith are increased further. During the spot-drilling operation, the guide lands are subjected to additional loading if the drill bit becomes displaced laterally relative to its center axis or axis of rotation. The lands seek to hold the drill bit in its off-center position, while the drill bit is being forced back into the axis of rotation because of the design of the main cutting edges. Frequently, this causes drilled holes to become out-of-round, which results in additional loading and in wearing of the lands. The capacity to regrind the drill bit is also considerably restricted.

To counter these problems, twist drill bits have been created having additional guide lands, which are instrumental in increasing the roundness of the drilled hole. They have the disadvantage, however, that they cannot compensate for relatively large displacements of the drill bit out of the axis of rotation, and are therefore actually disadvantageous with respect to the service life.

SUMMARY OF THE INVENTION

It is therefore the object of the invention to create a drill bit, of the type mentioned at the outset, which does not have these disadvantages.

To achieve this object, there is proposed a drill bit having a front side and having a circumferential surface adjoining the front side. Provided on the front side is a main cutting edge comprising a transverse cutting edge that intersects the center axis or axis of rotation of the drill bit. Adjoining the ends of the transverse cutting edge are first and second main cutting-edge regions extending toward the circumferential surface. At least two chip flutes, which serve to remove from the work region chips that have been taken off by the main cutting edge, are realized in the circumferential surface. First and second webs remain between the chip flutes. The circumferential surface additionally has three lands, of which a first adjoins the end of the first main cutting-edge region facing away from the transverse cutting edge, which land has a free cutting edge, and a second adjoins the end of the second main cutting-edge region facing away from the transverse cutting edge, and serves as a guide land. The third land serves as a support land.

The drill bit is distinguished in that the guide land is disposed on the first web, while the support land is located, together with the free cutting-edge land having the free cutting edge, on the second web.

The distribution of the lands on the circumferential surface of the drill bit, as proposed here, effects optimal guidance, both during the spot-drilling operation and during the further production of a drilled hole in a workpiece. The drill bit in this case is supported in such a way that drifting out of the center axis, or axis of rotation, and also chatter during the machining of a workpiece are reliably prevented.

A preferred exemplary embodiment of the drill bit is distinguished in that the lands are disposed on the circumferential surface in such a way that, during the machining of a workpiece, forces introduced into the drill bit via the lands are directed in such a way that a resultant force is obtained, which extends in the direction, or practically in the direction, of the transverse cutting edge and results in the drill bit being displaced parallel relative to the latter, or substantially parallel relative to the transverse cutting edge, i.e. in the longitudinal direction of the transverse cutting edge, and being centered in the drilled hole. Chatter is thereby prevented. In addition, the drill bit cuts free in the case of wear of the main cutting edge.

A preferred exemplary embodiment of the drill bit is distinguished in that the angular pitch of the two main cutting-edge regions is unequal, such that, in the front side of the drill bit, they do not lie together on a notional diameter line, but are disposed in relation to one another at an angle other than 180°. Likewise, as a result of this design, the drill bit is guided during spot-drilling and during the machining of a workpiece, and both deviation from the desired axis of rotation and chatter are prevented.

A further exemplary embodiment of the drill bit is distinguished in that the width of the webs measured in the circumferential direction differs, and that the support and also the land having the free cutting edge are provided on the wider web.

A further preferred exemplary embodiment is distinguished in that the main cutting-edge regions are offset in relation to one another, as viewed in the axial direction of the drill bit. In this case, the main cutting-edge region whose free cutting-edge land is provided on the same web as the support land leads axially relative to the other main cutting-edge region.

Further designs are disclosed by the rest of the dependent claims.

The invention is explained more fully in the following with reference to the drawing, wherein:

DESCRIPTION OF A PREFERRED EMBODIMENT

Figure 1:
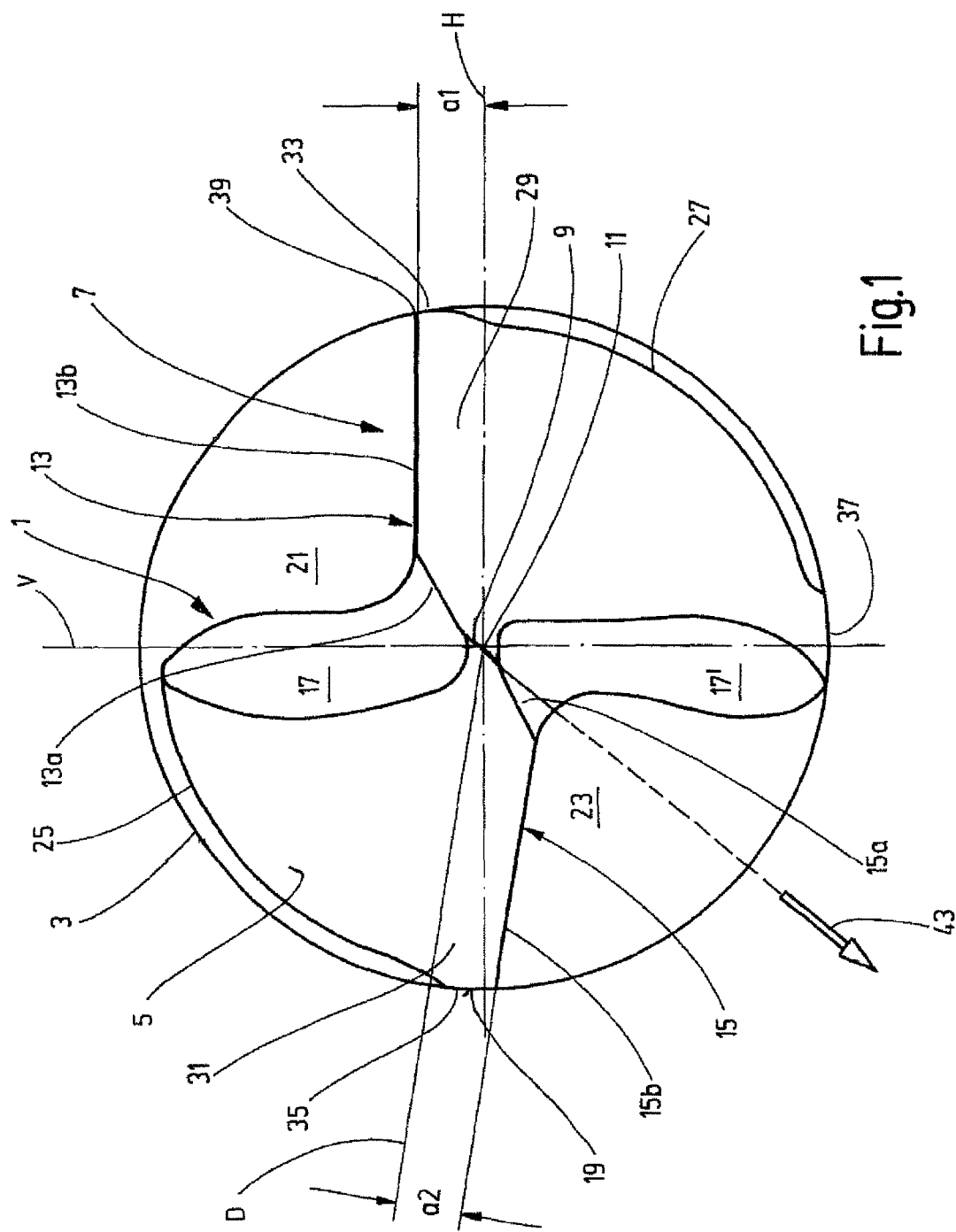
FIG. 1 shows a front-side view of a drill bit.

FIG. 1 shows a front view of a drill bit 1. To simplify the explanations, the wall of a drilled hole machined in a workpiece by means of the drill bit 1 is indicated by a circle 3.

The drill bit 1 has a front side 5, shown in a top view in FIG. 1. This front side comprises a main cutting edge 7 having a plurality of regions, namely, having a transverse cutting edge 9, which extends through the center axis 11 of the drill bit 1, and having two main cutting-edge regions 13 and 15 adjoining the transverse cutting edge 9.

Realized in the front side 5 here is a pointed portion 17, 17', which serves to shorten the transverse cutting edge 9. Such a design is known in principle, such that it is not considered in greater detail here.

Realized in the circumferential surface 19 of the drill bit 1, which circumferential surface extends substantially perpendicularly relative to the plane of the image of FIG. 1 and adjoins the front side 5, are two chip flutes 21, 23, which serve to carry away chips produced during the machining of a workpiece. Webs 25 and 27 are located between these chip flutes.

FIG. 1 shows a broken horizontal line H and a broken vertical line V, in the intersection point of which is located the center axis 11, which is perpendicular to the plane of the image of FIG. 1. It constitutes the axis of rotation of the drill bit 1 during the machining of a workpiece. The first main cutting-edge region 13 starts at the transverse cutting edge 9. Because of the pointed portion 17, a first portion 13a extends firstly upwards to the right, for example at an angle of approximately 30° relative to the horizontal line H in this case. An adjoining portion 13b of the main cutting-edge region 13 then extends further toward the circumferential surface 19 of the drill bit 1, in this case substantially parallel in relation to the horizontal line H. It is disposed at a distance a1 from the latter.

Starting on the other side of the transverse cutting edge 9 is the main cutting-edge region 15, whose first portion 15a, because of the pointed portion 17', extends in this case, for example, at an angle of, for instance, somewhat over 25° relative to the horizontal H in this case, and whose second portion 15b reaches as far as the circumferential line 19. This portion 15b extends somewhat upwards to the left in FIG. 1. If a diameter line D is drawn through the center axis 11, and this diameter line is placed so that it is approximately parallel to the portion 15b of the main cutting-edge region 15 that extends obliquely upwards, a distance a2 is obtained here between the diameter line D and this portion 15b. In the case of the exemplary embodiment represented here, a1 is less than a2.

The front side 5 of the drill bit 1 falls away, starting from the portion 15b of the main cutting-edge region 15 that intersects the circumferential surface 19 of the drill bit 1, into the plane of the image. In addition, the front side 5 falls away, starting from the portion 13b of the first main cutting-edge region 13 that intersects the circumferential surface 19 of the drill bit 1, into the plane of the image of FIG. 1. In this way, a main flank 29 of the main cutting-edge region 13 and a main flank 31 of the main cutting-edge region 15 are created.

From the front-face view of the drill bit 1, it is clear that the latter is supported on the wall of the drilled hole, indicated by the circle 3, via three lands, when the drill bit 1 goes into a drilled hole in a workpiece, not represented. It is provided in this case that a first free cutting-edge land 33 adjoins the end of the first main cutting-edge region 13 that faces away from the transverse cutting edge 9, and that a guide land 35, preferably realized as a cylindrically ground land, adjoins the end of the second main cutting-edge region 15 that faces away from the transverse cutting edge 9. Finally, the drill bit 1 is supported on the wall of the drilled hole via a third land, which is designated as a support land 37.

FIG. 1 shows clearly that the guide land 35 is provided on the first web 25, and that both the free cutting-edge land 33 and the support land 37 are provided on the second web 27. With one of the ends of the first and second main cutting-edge regions 13, 15 facing away from the transverse cutting edge 9, the support land 37 encloses an angle of 45° to 100°. The land that is closest to the support land 37, i.e. in this case the free cutting-edge land 33, is provided with a radial relief angle.

A free cutting edge 39 is assigned to the free cutting-edge land 33 provided on the second web 27.

Figure 2:
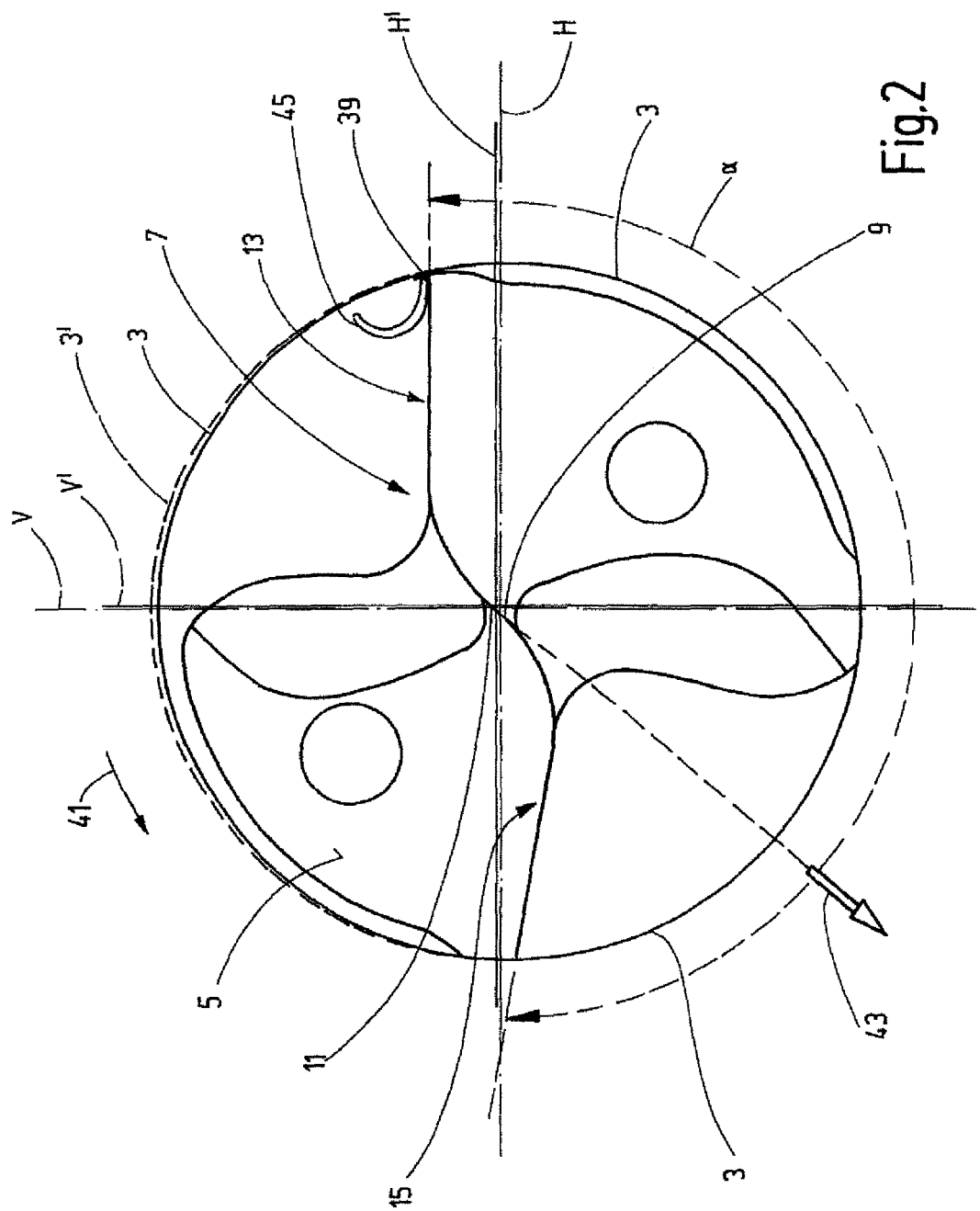
FIG. 2 shows a view according to FIG. 1, with help lines to explain a free cutting-edge effect.

During the machining of a workpiece by means of the drill bit 1, the latter rotates in the counter-clockwise direction in the case of the representation according to FIG. 1, as indicated by an arrow 41 shown in FIG. 2. It is possible, in principle, to cause the workpiece to rotate and to immobilize the drill or, also, to have both parts rotating in opposing directions, in order to effect a relative rotation. If the main cutting edge 7 takes chips off a workpiece, these chips flow into the chip flutes 21 and 23, which fall away perpendicularly into the plane of the image of FIG. 1. In this case, the chips taken off by the main cutting-edge region 13 go into the—as viewed in the direction of rotation—leading chip flute 21, and the chips taken off by the main cutting-edge region 15 go into the associated chip flute 23.

During the machining of a drilled hole, forces are introduced into the drill bit 1, via the main cutting edge 7 and via the three lands. This results in the drill bit 1 bearing reliably on the guide land 35 and on the support land 37 and being correctly guided in the drilled hole being produced.

Should the main cutting edge 7 become worn, the diameter of the drilled hole being produced in the workpiece is reduced, i.e. also that of the representative circle 3 in FIG. 1. This can result in the drill bit 1 becoming jammed in the drilled hole being produced.

In the case of the exemplary embodiment represented in FIG. 1, if the main cutting edge 7 becomes worn it is ensured, by means of the free cutting edge 39, that the drill bit 1 cuts free, i.e. does not become jammed in the workpiece.

FIG. 1 also shows additionally that, in the case of chatter of the drill bit 1, the latter is supported in the wall of the drilled hole by the three lands, being the free cutting-edge land 33, the guide land 35 and the support land 37. The support forces on the drill bit 1 applied to the three lands by the wall of the drilled hole, together with the forces introduced into the drill bit 1 via the main cutting edge 7, produce a resultant force having the direction indicated by the double arrow 43. As a result, the drill bit is reliably placed—downwards to the left in FIG. 1—against the guide land 35 and the support land 37, such that the chatter is suppressed.

FIG. 2 shows the drill bit 1 in a front-side view. The free cutting-edge effect is to be explained more fully by means of help lines. Parts that are the same are denoted by the same references, such that, to that extent, reference is made to the description relating to FIG. 1. For greater clarity, some references that are dispensable for the explanations relating to FIG. 2 have been omitted.

FIG. 2 shows the broken horizontal line H and the broken vertical line V, which intersect in the center point of a drilled hole indicated by the circle 3, and in whose intersection point the center axis 11 of the drill bit 1 is located. During use of the drill bit 1 and machining of a workpiece, the main cutting edge 7 provided on the front side 5 takes chips off the workpiece, which is not represented here. In this case, forces act upon the drill bit 1 via the main cutting edge 7 and via the three lands, being the free cutting-edge land 33, the guide land 35 and the support land 37, the resultant force, which is directed in the direction of the double arrow 43 and which is located on a notional line that extends in the extension of the transverse cutting edge 9, being produced upon a rotation of the drill bit 1 in the direction of the arrow 41. The drill bit 1—thus also its transverse cutting edge 9—is thus pressed downwards to the left and thereby displaced substantially or exactly parallel in relation to its transverse cutting edge 9, in order for it to bear reliably on the guide land 35 and on the support land 37 and be guided in the drilled hole. This resultant force 43 enables chatter to be reliably prevented or at least greatly reduced.

In the case of the main cutting edge 7 becoming worn, the diameter of the drilled hole produced by the drill bit 1 decreases, such that the wall of the drilled hole is no longer located on the circle 3, but on the circle 3' represented by a broken line. The center point of the latter coincides with the intersection point of the unbroken horizontal line H' and the unbroken vertical line V'. The forces acting in the direction of the double arrow 43 cause the drill bit to continue to be forced downwards to the left.

Since, in the case of the main cutting edge 7 becoming worn, the diameter of the circle 3' representing the wall of the drilled hole is reduced, the drill bit 1, whose diameter has remained the same apart from in the region of the worn main cutting edge 7, would become jammed in the drilled hole being produced. It is found, however, that in this case, according to FIG. 2, the free cutting edge 39 takes chips 45 off the wall of the drilled hole and thereby enlarges the diameter of the drilled hole, such that the drill bit 1 cuts free and jamming in the drilled hole is prevented. The displacement of the drill bit 1 almost or exactly parallel in relation to its transverse cutting edge 9 is intended to mean that the drill bit is displaced practically in the longitudinal direction of the transverse cutting edge 9. As a result, the undeformed chip thicknesses at the transverse cutting edge 9 and at the main cutting-edge regions 13, 15 are altered in an order of magnitude of less than 1%. For the cutting edges, therefore, there is no significant additional loading. Since, in the case of such a displacement, the main cutting-edge region 13 assigned to the free cutting edge 39 is subjected to a greater undeformed chip thickness load, it is ensured that the drill bit 1 bears reliably on the support land 37 and vibration, or chatter, is prevented.

A pitch angle α between the main cutting-edge regions 13 and 15 is indicated in FIG. 2. It is obvious that these regions are not directly opposite each other. The pitch angle here is greater than 180°. In the case of this preferred design, there is obtained a defined resultant cutting force in the radial direction, which results in the drill bit 1 producing an oversized drilled hole. The transverse cutting edge 9, however, remains centrally disposed in this case, such that it centers the drill bit 1 in a drilled hole and stabilizes it during a spot-drilling operation.

FIG. 2 also shows that the support land 37 is located within this pitch angle α, which is greater than 180°.

Figures 3, 3A:
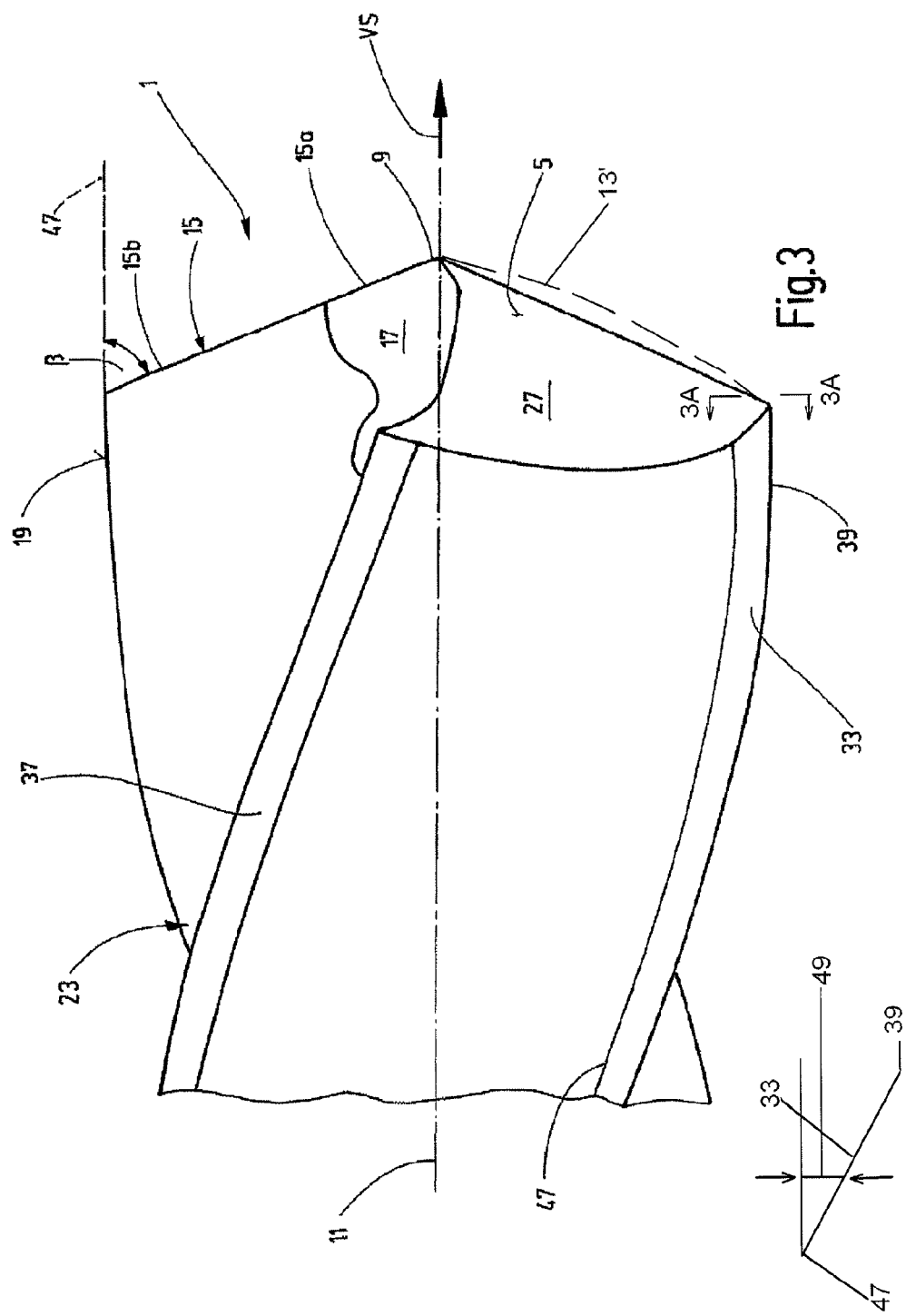
FIG. 3 shows a side view of the front part of a drill bit according to FIG. 1.
FIG. 3A shows a cross-section of a portion of FIG. 3.

FIG. 3, finally, shows a side view of the front, truncated end of the drill bit 1, wherein parts that are the same are denoted by the same references, such that reference is made to the description of FIG. 1. For greater clarity, however, some references that are dispensable for the explanations relating to FIG. 3 have been omitted.

Here, it becomes clear that the drill bit 1 is provided with chip flutes, which extend along a notional helical line, and of which the chip flute 23 can be seen here. It is also conceivable to provide a drill bit having chip flutes aligned parallel in relation to the center axis 11 of the drill bit.

A part of the front side 5 can be seen, on which there is disposed the transverse cutting edge 9, which intersects the center axis 11, and the main cutting edge 7, of which the second main cutting-edge region 15 above the center axis 11 can be seen here. The first portion 15a of the second main cutting-edge region that adjoins the transverse cutting edge 9 and the pointed portion 17 merge into the second portion 15b, which extends as far as the circumferential surface 19.

Beneath the chip flute 23 in FIG. 3 is the adjoining support land 37. The free cutting edge 39, with the associated free cutting-edge land 33, can be seen at the bottom. The latter is realized by a narrow, ideally linear, cylindrically ground land. A line 47 indicates that the free cutting edge 39 can have a relief angle 49, shown in FIG. 3A, such that a free cutting-edge flank is constituted here.

The setting angle β, which is measured between the second main cutting-edge region 15 and a help line 47, which extends parallel in relation to the center line 11 of the drill bit 1, is indicated in FIG. 3. The setting angle of the main cutting-edge region 13, which is not visible in FIG. 3, is measured in a corresponding manner.

For the purpose of stabilizing the drill bit 1 in a drilled hole to be machined, it is provided that one of the two main cutting-edge regions leads relative to the other in the axial direction, i.e. as viewed in the direction of the center axis 11 and in the direction of advance VS. Preferably, it is provided that the first main cutting-edge region 13 assigned to the free cutting edge 39 leads axially relative to the second main cutting-edge region 15 assigned to the guide land 35. There are several possibilities for achieving this.

A first embodiment variant is to be explained with reference to FIG. 1. The main flank 29 adjoining the first main cutting-edge region 13 falls away, starting from the main cutting-edge region 13, into the image plane of FIG. 1. The second main cutting-edge plane region 15 also falls away into the image plane, such that the main flank 31 is constituted here. The portion 13b of the first main cutting-edge region 13 extends, at a distance a1, parallel in relation to the horizontal line H. The diameter line D, which intersects the center line 11 and which extends at a distance a2 from the portion 15b, is indicated parallel to the portion 15b of the main cutting-edge region 15. The distances a1 and a2 characterize the distance from the center line 11 of the portion 13b of the main cutting-edge region 13 and of the portion 15b of the main cutting-edge region 15. Here, it is the case that: a1>a2, which is not obvious from FIG. 1. i.e. the center distance a1 of the portion 13b is greater than the center distance a2 of the portion 15b. As a result, the first main cutting-edge region 13 leads in the axial direction relative to the second main cutting-edge region 15. Thus, for the viewer of FIGS. 1 and 2, the portion 13b is more prominent than is the case with the portion 15b of the second main cutting-edge region 15. It is thus possible, through center distances of differing magnitude, to achieve an axial offset of the two main cutting-edge regions in relation to each other, and to realize the axial lead of the first main cutting-edge region 13 through a greater center distance, i.e. distance a1.

A further possibility for realizing differing axial positions of the two main cutting-edge regions consists in assigning differing setting angles β to the two main cutting-edge regions.

The setting angle β of the second main cutting-edge region 15 is shown in FIG. 3; as explained, it was measured relative to a help line 47, which extends parallel relative to the center axis 11 of the drill bit 1. In the representation according to FIG. 3, the setting angle β of the second main portion region 15 is, purely by way of example, somewhat more than 20°. If the same setting angle is selected for the first main cutting-edge region 13, both main cutting-edge regions 13 and 15—as viewed in the direction of the center axis 11, or in the direction of advance indicated by the arrow VS—are located at the same axial height. If a greater setting angle β is selected for the first main cutting-edge region 13, or for its portion 13b, than for the second main cutting-edge region 15, then the first main cutting-edge region 13 leads the second main cutting-edge region 15, which is visible in FIG. 3, in the axial direction. The angular difference is preferably less than 1°.

It is possible, moreover, to realize an axial offset of the two main cutting-edge regions 13 and 15 in that the two main cutting-edge regions differ from one another in their form.

The exemplary embodiment of the drill bit 1 represented in FIG. 3 shows main cutting-edge regions 13 and 15 realized such that they are straight. Frequently, however, it is provided that these are realized so as to be hollow or convex. It is also conceivable for one main cutting-edge region to be hollow and the other convex in form.

If two hollow main cutting-edge regions are provided, the one that is less hollow leads in the axial direction. If one of the main cutting-edge regions is hollow and the other is straight, the straight main cutting-edge region leads axially. If one of the main cutting-edge regions is straight and the other is convex, the convex main cutting-edge region leads axially. FIG. 3 shows a convex main cutting-edge region 13' as a broken line. If, finally, it is provided that both main cutting-edge regions are convex, the one that is more convex leads axially.

From the explanations relating to FIGS. 1 to 3, it becomes clear that it is easily possible to center a drill bit 1 during the spot-drilling operation in the machining of a workpiece, additionally to prevent jamming of the drill bit 1 in the case of the main cutting edge 7 becoming worn and, finally, reliably to prevent vibration and chatter during the machining of workpieces. This does not require elaborate production of the drill bit 1. It is found that the distribution of the three lands of the drill bit 1 on the webs 25 and 27 achieves the desired effects. In this case, the guide land 35 of the second main cutting-edge region 15 is provided on a web 25 delimited by chip flutes 21 and 23, while the two other lands, namely, the free cutting-edge land 33 and the support land 37, are disposed on the other web 27, which is clear, in particular, from the front-side views according to FIGS. 1 and 2.

The design of the drill bit 1 selected here creates the possibility of using the latter at high cutting speeds of 100 m/min to, for example, 250 m/min, preferably 200 m/min. In the case of such cutting speeds, a very large quantity of heat is introduced into the tool. It has been explained above that this heating causes the drill bit 1 to expand. It is for this reason that the described free cutting-edge effect is important. Since the drill bit 1 additionally bears reliably on the support land 37, it is ensured that the workpiece itself does not undergo excessive heating in this case and possibly sustain damage. In this case, the structural form selected here additionally ensures that vibration and chatter is very reliably prevented or at least greatly reduced.

The invention claimed is:

1. A drill bit, having
a front side; and
a circumferential surface adjoining the front side,
wherein:
the front side has a main cutting edge comprising a transverse cutting edge extending through a center axis of the drill bit, and has first and second main cutting-edge regions adjoining the transverse cutting edge and extending radially toward the circumferential surface, the first and second main cutting-edge regions each including a first portion and a second portion,
the circumferential surface comprises at least two chip flutes, which between them delimit a first and a second web, and three lands, of which lands:
a first one of the lands adjoins an end of the first main cutting-edge region facing away from the transverse cutting edge, and the first land serves as a free cutting-edge land which has a free cutting edge, the free cutting edge cutting material from a wall of a drilled hole, which the drill bit is drilling, to enlarge a diameter of the drilled hole if the diameter of the drilled hole becomes less than a diameter of the drill bit, thereby allowing the drill bit to cut free of the wall of the drilled hole,
a second one of the lands adjoins an end of the second main cutting-edge region facing away from the transverse cutting edge, and the second land serves as a guide land, and
a third one of the lands serves as a support land,
the guide land is disposed on the first web,
the support land is disposed, together with the free cutting-edge land having the free cutting edge, on the second web, the support land being disposed on a first circumferential end of the second web, the first circumferential end of the second web being on an opposite end of the second web from a second circumferential end of the second web on which the free cutting-edge land having the free cutting edge is disposed,
the lands are so configured on the circumferential surface of the drill bit such that, during use of the drill bit, forces are introduced into the drill bit via the lands then supported on a wall of a drilled hole, and a resultant force of the forces extends parallel to the transverse cutting edge of the main cutting edge, the resultant force pressing the drill bit against the wall of the drilled hole in such a manner that the drill bit is supported by the guide land and by the support land bearing against the wall of the drilled hole, and
the first main cutting-edge region adjoins the second web and the second main cutting-edge region adjoins the first web.

2. The drill bit as claimed in claim 1, wherein the second web is wider in the circumferential direction than the first web.

3. The drill bit as claimed in claim 1, wherein the support land is disposed at an angle of 45° to 100° relative to one of the ends of the first and second main cutting-edge regions that face away from the transverse cutting edge.

4. The drill bit as claimed in claim 1, wherein a pitch angle between the main cutting-edge regions is other than 180°.

5. The drill bit as claimed in claim 4, wherein the pitch angle is greater than 180°, and the support land is disposed in the region of the pitch angle.

6. The drill bit as claimed in claim 1, wherein the first and second webs have different widths in the circumferential direction, the second web having a width measured in the circumferential direction that is greater than a width measured in the circumferential direction of the first web.

7. The drill bit as claimed in claim 6, wherein the second web is wider in the circumferential direction than the first web.

8. The drill bit as claimed in claim 1, wherein of the first main cutting-edge region leads axially, in the direction of the center axis and in the direction of advance of the drill bit, relative to the second main cutting-edge region.

9. The drill bit as claimed in claim 8, wherein the axial direction lead is realized through a greater center distance of the leading main cutting-edge region.

10. The drill bit as claimed in claim 8, wherein the axial direction lead is realized through a greater setting angle of the leading main cutting-edge region.

11. The drill bit as claimed in claim 8, wherein the axial direction lead is realized through a form of the leading main cutting-edge region that differs from that of the other main cutting-edge region.

12. The drill bit as claimed in claim 1, wherein the free cutting edge has a relief angle.

13. The drill bit as claimed in claim 1, further comprising a pointed portion positioned and configured for shortening the transverse cutting edge.

* * * * *